United States Patent
Buecherl et al.

(10) Patent No.: US 12,099,828 B2
(45) Date of Patent: Sep. 24, 2024

(54) METHOD FOR ASCERTAINING A DRIVE CLEARANCE AFTER A SOFTWARE UPDATE FOR A SET OF CONTROLLERS OF A VEHICLE, COMPUTER-READABLE MEDIUM, SYSTEM, AND VEHICLE

(71) Applicant: Bayerische Motoren Werke Aktiengesellschaft, Munich (DE)

(72) Inventors: Gunther Buecherl, Olching (DE); Tobias Kraeker, Munich (DE); Andre Mueller, Geisenfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 122 days.

(21) Appl. No.: 17/928,872

(22) PCT Filed: Mar. 31, 2021

(86) PCT No.: PCT/EP2021/058395
§ 371 (c)(1),
(2) Date: Nov. 30, 2022

(87) PCT Pub. No.: WO2021/259530
PCT Pub. Date: Dec. 30, 2021

(65) Prior Publication Data
US 2023/0297361 A1    Sep. 21, 2023

(30) Foreign Application Priority Data
Jun. 25, 2020  (DE) .................. 10 2020 116 715.6

(51) Int. Cl.
*G06F 8/65*    (2018.01)
*G06F 11/14*   (2006.01)

(52) U.S. Cl.
CPC ............ *G06F 8/65* (2013.01); *G06F 11/1433* (2013.01)

(58) Field of Classification Search
CPC .............................. G06F 11/1433; G06F 8/65
See application file for complete search history.

(56) References Cited

U.S. PATENT DOCUMENTS

2019/0324858 A1*  10/2019  Sarkar .................... H04L 67/34

FOREIGN PATENT DOCUMENTS

| CN | 112567333 A * | 3/2021 | ........... B60R 16/023 |
| DE | 102012023647 A1 | 6/2014 | |

(Continued)

OTHER PUBLICATIONS

International Search Report corresponding to International Patent Application No. PCT/EP2021/058395, dated Jun. 14, 2021 (4 pages).

*Primary Examiner* — Phillip H Nguyen
(74) *Attorney, Agent, or Firm* — Maginot, Moore & Beck LLP

(57) ABSTRACT

A method ascertains a drive clearance after a software update for a set of controllers of a vehicle. The method includes determining a first deviation between the first target state and the first actual state of the software updated. If the first deviation indicates, then a second deviation between the second target state of the set of second target states and the second actual state of the set of second actual states for a first controller is determined. The first controller is linked to a class from a specified controller classification, and one or more properties of controllers are linked to each class of the specified controller classes. If a second deviation indicates, and if a property of the ascertained class of the first controller indicates that the first controller can be downgraded, then the first controller is downgraded after the software update.

19 Claims, 1 Drawing Sheet

(56) References Cited

FOREIGN PATENT DOCUMENTS

| | | | |
|---|---|---|---|
| DE | 102017218872 A1 | | 4/2019 |
| DE | 102019109672 A1 | * 10/2019 | .......... G06F 11/1433 |
| DE | 102018209248 A1 | | 12/2019 |

* cited by examiner

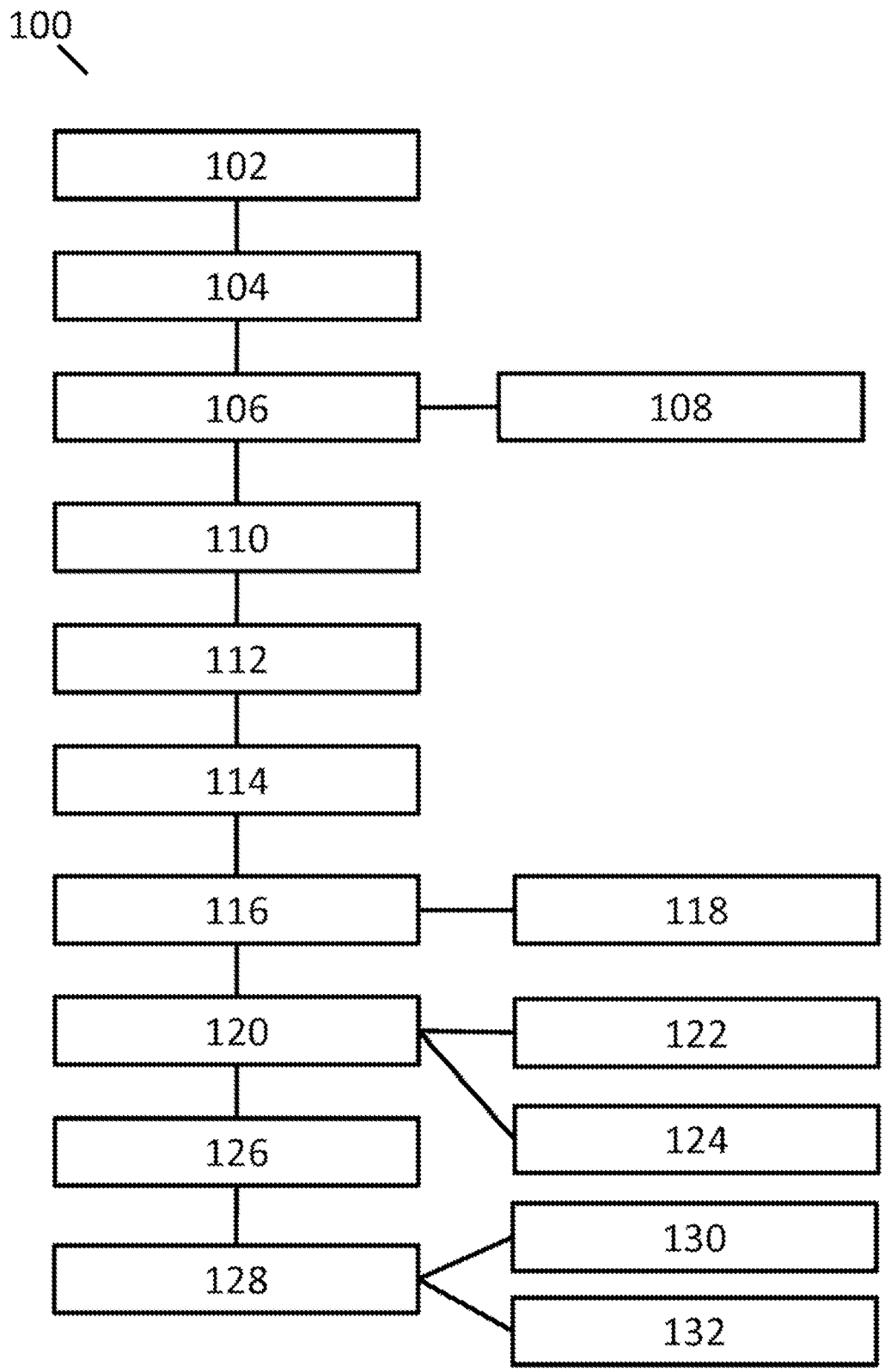

METHOD FOR ASCERTAINING A DRIVE CLEARANCE AFTER A SOFTWARE UPDATE FOR A SET OF CONTROLLERS OF A VEHICLE, COMPUTER-READABLE MEDIUM, SYSTEM, AND VEHICLE

The present application is the U.S. national phase of PCT Application PCT/EP2021/058395 filed on Mar. 31, 2021, which claims priority of German patent application No. 102020116715.6 filed on Jun. 25, 2020, which is incorporated herein by reference in its entirety.

TECHNICAL FIELD

The disclosure relates to a method for ascertaining a drive clearance after a software update of a set of controllers of a vehicle. The invention also relates to a computer-readable medium, and system for ascertaining a drive clearance after a software update of a set of controllers of a vehicle, and a vehicle comprising the system.

BACKGROUND

Vehicles having software that can be updated remotely are known from the prior art. When updating the software of vehicles, errors may occur which lead to the malfunction of one or more controllers of the vehicle. If an error occurs when updating the software of a vehicle controller, the vehicle can be put into an inoperable state. A customer can no longer use the vehicle when it is inoperative. The customer must carry out a vehicle repair on site or in a workshop.

It is therefore an object of the invention to ascertain a drive clearance efficiently after a software update of the vehicle. In particular, an object of the invention is to avoid the immobilization of a vehicle after a software update of the vehicle in an efficient way.

SUMMARY

This object is achieved by the features of at least some of the embodiments and developments disclosed herein.

A first aspect is characterized by a method for ascertaining a drive clearance after a software update of a set of controllers of a vehicle. The method can be a computer-implemented method and/or a controller-implemented method. The vehicle can be a partially, highly, or fully automatically driven vehicle. The set of controllers can be predefined. Preferably, the set of controllers comprises all controllers covered by the software update. The software update can update the software of one or more controllers from the set of controllers. Preferably, the software update comprises an update of the software for each controller from the set of controllers. The software update may depend on a vehicle configuration. In particular, the software update may depend on a controller configuration of the vehicle.

The method comprises receiving a first target state of the software update, said first target state representing a target state of all of the controllers of the set of controllers after the software update for the controllers of the vehicle, determining a first actual state of the software update, said first actual state representing the actual state of all of the controllers of the set of controllers after the software update for the controllers of the vehicle, and determining a first deviation between the first target state and the first actual state. If the first deviation indicates a deviation between the first target state and the first actual state, the method receives a set of second target states of the software update, a second target state of the set of second target states representing a target state of a software update for an individual controller of the set of controllers of the vehicle. In addition, the method determines a set of second actual states of the software update, a second target state of the set of second target states representing a target state of a software update for an individual controller of the set of controllers of the vehicle, and receives a specified controller classification, said specified controller classification comprising multiple classes, and a controller of the set of controllers being linked to a class of the specified controller classification, and one or more properties of controllers being linked to each class of the specified controller classes. The method also determines a second deviation between a second target state of the set of second target states and a second actual state of the set of second actual states for a controller of the set of controllers.

If the second deviation indicates a deviation between the second target state of the controller and the second actual state of the controller, the method ascertains the class of the controller using the specified controller classification. If a property of the ascertained class of the controller indicates that the controller can be downgraded, the method downgrades the controller after the software update, checks whether the downgrade of the controller has been successful, and grants a limited drive clearance after the successful downgrade of the controller. The limited drive clearance may allow the vehicle to be driven, but functions of successfully downgraded controllers will not be available while driving. In addition, in the case of a limited drive clearance, the vehicle can provide a message to a user of the vehicle, the message comprising at least a warning of the limited drive clearance.

Advantageously the method can grant a limited drive clearance if one or more controllers from the set of controllers show a deviation from the target state after the software update. Immobilization of the vehicle after an incorrect software update of a controller can be efficiently avoided.

According to an advantageous design, the first target state can include a cryptographic hash value, and/or the first actual state can include a cryptographic hash value, and/or a second target state from the set of second target states can include a cryptographic hash value and/or a second actual state from the set of second actual states can include a cryptographic hash value. By using cryptographic hash values, the security can be efficiently increased when ascertaining the drive clearance and/or limited drive clearance. Furthermore, a deviation between the first target state and the first actual state and/or between the second target state and the second actual state can be determined efficiently and unambiguously.

According to a further advantageous design, a first hash function can determine the cryptographic hash value of the first actual state during the software update of the set of controllers, and/or the first hash function can determine the cryptographic hash value of the first actual state based on the cryptographic hash values of the second actual states from the set of second actual states. This allows the first actual state to be determined efficiently.

According to a further, advantageous embodiment a second hash function can determine the cryptographic hash value of a second actual state of a controller after the software update of the controller. This allows the second actual state to be determined efficiently.

In accordance with a further advantageous design, the method can additionally comprise granting the drive clearance after a software update, if the first deviation does not indicate a deviation between the first target state and the first actual state. This enables a drive clearance to be ascertained efficiently.

In accordance with a further advantageous design, the method can additionally comprise preventing the drive clearance after the software update, if a property of the ascertained class of the controller indicates that the controller is drive-critical. This can be used to efficiently prevent unsafe operation of the vehicle after the software update.

In accordance with a further advantageous design, the method can additionally comprise granting a limited drive clearance after the software update, if a property of the ascertained class of the controller indicates that the controller is not drive-critical. This enables a limited drive clearance to be ascertained efficiently.

According to a further advantageous design, the downgrading of the controller after the software update can comprise ascertaining an additional controller from the set of controllers, the additional controller being able to execute a command to downgrade the controller, then executing the command to downgrade the controller on the ascertained additional controller, and downgrading the controller after the software update by executing the command to downgrade the controller on the ascertained additional controller. This allows a controller to be downgraded efficiently.

Another aspect is characterized by a computer-readable medium for ascertaining a drive clearance after a software update of a set of controllers of a vehicle, wherein the computer-readable medium comprises instructions that, when executed on a computer and/or a controller, carry out the method described above.

A further aspect is characterized by a system for ascertaining a drive clearance after a software update of a set of controllers of a vehicle, the system being designed to carry out the method described above.

Another aspect is characterized by a vehicle comprising the system described above for ascertaining a drive clearance after a software update of a set of controllers of the vehicle.

Additional features arise from the claims, the figures and the description of the figures. All the features and feature combinations cited in the description above, and the features and feature combinations cited in the description of the figures below and/or shown in the figures alone are applicable not only in the respective combination indicated, but also in other combinations or else in isolation.

In the following, a preferred exemplary embodiment of the invention is described by reference to the attached drawings. This will reveal further details, preferred embodiments and extensions of the invention.

BRIEF DESCRIPTION OF THE DRAWING

FIG. 1 schematically shows an exemplary method for ascertaining a drive clearance after a software update of a set of controllers of a vehicle.

DETAILED DESCRIPTION

FIG. 1 shows an exemplary method 100 for ascertaining a drive clearance after a software update of a preferably specified set of controllers of a vehicle. The method can be carried out as part of a functional safety test of the vehicle after the software update of the specified set of controllers. The method can receive a first target state of the software update 102. For example, the method can receive the first target state from a vehicle-external server. The vehicle-external server can be a server of a backend of a vehicle manufacturer. The first target state preferably represents a target state of all the controllers from the set of the controllers after the software update of all the controllers from the set of controllers of the vehicle. The first target state can be determined by a vehicle-external server and transmitted to the vehicle before carrying out the software update. The first target state can comprise a cryptographic hash value that can be ascertained by the vehicle-external server using a first hash function. For example, the first hash function can calculate the first target state based on the cryptographic hash values of second target states, with each second target state comprising a cryptographic hash value that can specify a target state of the software update of a single controller from the set of controllers. The second target states can have a specified order that can be used by the first hash function to determine the cryptographic hash value of the first target state based on the cryptographic hash values of the second target states. The specified order can be defined based on diagnostic codes of the controllers, for example. For example, the first hash function can calculate a cryptographic hash value for the first target state by using the cryptographic hash values of the respective target states of the first two controllers of the specified order to ascertain a cryptographic hash value of an intermediate target state. With this cryptographic hash value of the intermediate target state and the cryptographic hash value of the target state of a subsequent controller of the specified order, the first hash function can in turn determine a cryptographic hash value of an additional intermediate target state. This step is carried out for each additional controller in the specified order. The first target state is preferably the cryptographic hash value which is determined after applying the first hash function to all controllers of the specified order.

The method 100 can determine a first actual state of the software update 104. The first actual state can represent an actual state of all the controllers from the set of the controllers after the software update of all the controllers from the set of controllers of the vehicle. Preferably, the first actual state can comprise a cryptographic hash value. The first actual state can be determined by the vehicle. The method can execute the first hash function on one controller of the vehicle to determine the cryptographic hash value of the first actual state during the software update of the set of controllers. For example, the first hash function can calculate the first actual state based on the cryptographic hash values of second actual states, with each second actual state comprising a cryptographic hash value that can specify an actual state of the software update of a single controller from the set of controllers. Similarly, to the process of ascertaining the first target state described above on the vehicle-external server, the first actual state in the vehicle is calculated in order to obtain comparability of the first target state and the first actual state. In other words, the first hash function is executed redundantly both on the vehicle-external server and in the vehicle.

The method 100 can determine a first deviation between the first target state and the first actual state 106. To do this, the method 100 can compare the cryptographic hash value of the first target state with the cryptographic hash value of the first actual state. If the first deviation does not indicate a deviation between the first target state and the first actual state, the software has been updated successfully for all controllers from the set of controllers. In this case, the method 100 can grant a drive clearance, in particular an unlimited drive clearance, after the software update 108. The term drive clearance specifies an unlimited drive clearance.

If the first deviation indicates a deviation between the first target state and the first actual state, one or more errors have occurred in updating the software of individual controllers from the set of controllers. In this case, the method 100 can identify the controller or controllers from the set of controllers, for which a software update error has occurred. For each controller from the set of controllers, the method 100 can check for the presence of an error in the software update by comparing the respective second target states of the software update with the respective second actual states in order to detect a deviation following the software update. In detail, the method 100 can receive a set of second target states of the software update 110. A second target state from the set of second target states can represent a target state of a software update for an individual controller of the set of controllers of the vehicle. The second target state can be transmitted to the vehicle by the vehicle-external server. Every second target state can comprise a cryptographic hash value. The cryptographic hash value of the second target state can be ascertained by means of a second hash function. The second hash function is preferably different from the first hash function.

Furthermore, the method 100 can determine a set of second actual states of the software update 112. A second actual state from the set of actual states can represent an actual state of a software update for an individual controller of the set of controllers of the vehicle. Every second actual state can comprise a cryptographic hash value. The cryptographic hash value of the second actual state can be ascertained by means of the second hash function. The second hash function is preferably different from the first hash function. To determine 112 a second actual state of a particular controller from the set of controllers, the method 100 can execute the second hash function after the software update.

The method 100 can receive a specified controller classification 114. The specified controller classification can comprise multiple classes. Preferably, the specified controller classification can comprise three classes: one class for drive-critical controllers, one class for non-drive-critical controllers, and one class for downgradable controllers. A controller from the set of controllers can be linked to a class from the specified controller classification. Preferably, each controller from the set of controllers is linked to one class from the specified controller classification. Also, one or more properties of controllers can be linked to each class of the specified controller classification. For example, a property of controllers that are linked to a class may comprise the following values: drive-critical, non-drive-critical, downgradable. Drive-critical means that a drive clearance is blocked if the software update results in an error. Non-drive-critical means that a limited drive clearance is granted in the event of an incorrect software update. Finally, downgradable means that in the event of an incorrect software update and a successful downgrade a limited drive clearance is granted, and a drive clearance is prevented in the event of an incorrect software update and no successful downgrade.

The method 100 can also determine a second deviation between a second target state of the set of second target states and a second actual state of the set of second actual states for a controller from the set of controllers 116. For this purpose, the method 100 can compare the respective cryptographic hash value of the second target state of a controller from the set of controllers to the respective cryptographic hash value of the second actual state of the controller from the set of controllers. If the second deviation does not indicate a deviation between the second target state of the respective controller and the second actual state of this controller, the software update for this controller from the set of controllers was successful.

The method 100 can determine 118 the second deviation for an additional controller from the set of controllers for which a second deviation has not yet been determined, and carry out the further steps of the method 100 for the additional controller. If the method 100 has determined the second deviation for all controllers from the set of controllers, the method ends with the ascertained drive clearance, a drive clearance or a limited drive clearance, or no drive clearance. If no drive clearance could be ascertained, the immobilizer of the vehicle remains active.

If the second deviation indicates a deviation between the second target state of the controller and the second actual state of the controller, an incorrect software update for this controller may have occurred. The method 100 can ascertain the class of the controller using the specified controller classification 120. If a property of the ascertained class of the controller indicates that the controller is drive-critical, the method 100 can prevent the drive clearance after the software update 122. In this case, the vehicle's immobilizer remains active. If a property of the ascertained class of the controller indicates that the controller is not drive-critical, the method 100 can grant 124 a limited drive clearance after the software update. Functions of the non-drive-critical controller are not available to a user of the vehicle.

The vehicle may issue the user with a message indicating the functions that are not available to the user and/or prompt the user of the vehicle to have the incorrect software update repaired in a workshop.

If a property of the ascertained class of the controller indicates that the controller can be downgraded, the method 100 can downgrade the controller after the software update 126. Downgrading 126 the controller can comprise ascertaining an additional controller from the set of controllers, the additional controller being able to execute a command to downgrade the controller. For example, each downgradable controller can be linked to one or more additional controllers that can perform a downgrade of the downgradable controller. Alternatively, the downgradable controller can execute the downgrade command itself. Further, the downgrading 126 of the controller may comprise executing the command to downgrade the controller on the ascertained additional controller, and downgrading the controller after the software update by executing the command to downgrade the controller on the ascertained additional controller. In addition, whenever a controller is downgraded, the method 100 can issue a message to the vehicle user, the message informing the vehicle user of the downgrade of the controller and/or a possible limited functionality.

The method 100 can check 128 whether the controller has been downgraded successfully. For example, if the downgrade involves shutting down the controller or shutting down sub-functions of the controller, the method can check whether the corresponding shutdown was successful. In addition, the method 100 can grant 130 a limited drive clearance after the controller has been successfully downgraded. The limited drive clearance only applies to controllers and/or functions of controllers for which the software update was successful. Controllers and/or functions of controllers for which the software update was unsuccessful and which were successfully downgraded are not available in the event of the limited drive clearance. If the downgrade 126 is not successful, the method 100 prevents 132 the drive clearance, in particular the limited drive clearance. The vehicle's immobilizer remains active. The successful downgrade of a controller cannot be reversed by the additional controller or the successfully downgraded controller itself. In other words, the successful downgrade of a controller is permanent. The successfully downgraded controller can only be switched on again or activated manually by an authorized employee in a workshop. Advantageously, the method can efficiently prevent vehicles from being rendered immobile after an incorrect software update of individual downgradable controllers. The method can efficiently grant a limited drive clearance and thus prevent vehicles from being immobilized.

LIST OF REFERENCE SIGNS

100 method
102 receiving a first target state
104 determining a first actual state
106 determining a first deviation
108 granting a drive clearance
110 receiving a set of second target states
112 determining a set of second actual states
114 receiving a specified controller classification
116 determining a second deviation of a controller
118 determining a second deviation of an additional controller
120 ascertaining the class of the controller
122 preventing a drive clearance
124 granting a limited drive clearance
126 downgrading the controller
128 checking whether the controller has been downgraded successfully
130 granting a limited drive clearance
132 preventing a drive clearance

The invention claimed is:

1. A method for ascertaining a drive clearance after a software update for a set of controllers of a vehicle, said method comprising:
   receiving a first target state of the software update, said first target state representing a target state of the controllers of the set of controllers after the software update for the set of controllers of the vehicle;
   determining a first actual state of the software update, said first actual state representing an actual state of the controllers of the set of controllers after the software update for the set of controllers of the vehicle;
   determining a first deviation between the first target state and the first actual state; and
   if the first deviation indicates a deviation between the first target state and the first actual state, then:
      receiving a set of second target states of the software update, a second target state of the set of second target states representing a target state of a software update for a first controller of the set of controllers of the vehicle;
      determining a set of second actual states of the software update, a second actual state of the set of second actual states representing an actual state of a software update for the first controller of the set of controllers of the vehicle;
      receiving a specified controller classification, said specified controller classification comprising multiple classes, and the first controller from the set of controllers being linked to a class from the specified controller classification, and
      wherein one or more properties of controllers are linked to each class of the specified controller classes;
      determining a second deviation between the second target state of the set of second target states and the second actual state of the set of second actual states for the first controller of the set of controllers; and
      if the second deviation indicates a deviation between the second target state and the second actual state of the first controller:
         ascertaining the class of the first controller using the specified controller classification;
         if a property of the ascertained class of the first controller indicates that the first controller can be downgraded:
            downgrading the first controller after the software update;
            checking whether the downgrade of the first controller has been successful; and
            granting a limited drive clearance after the successful downgrade of the first controller.

2. The method as claimed in claim 1, wherein at least one of the first target state, the first actual state, the second target state, and the second actual state comprises a cryptographic hash value.

3. The method as claimed in claim 2, wherein a first hash function determines the cryptographic hash value of the first actual state during the software update of the set of controllers, and/or
   wherein the first hash function determines the cryptographic hash value of the first actual state based on the cryptographic hash values of the second actual states from the set of second actual states.

4. The method as claimed in claim 3, wherein a second hash function determines the cryptographic hash value of the second actual state of the first controller after the software update of the first controller.

5. The method as claimed in claim 2, wherein a hash function determines the cryptographic hash value of the second actual state of the first controller after the software update of the first controller.

6. The method as claimed in claim 1, said method further comprising:
   if the first deviation indicates no deviation between the first target state and the first actual state, then granting the drive clearance after a software update.

7. The method as claimed in claim 6, said method further comprising:
   if the second deviation indicates a deviation between the second target state and the second actual state of the first controller, and if the property of the ascertained class of the first controller indicates that the first controller is drive-critical, then
   preventing the drive clearance after the software update.

8. The method as claimed in claim 7, said method further comprising:
   if the second deviation indicates a deviation between the second target state and the second actual state of the first controller, and if the property of the ascertained class of the first controller indicates that the first controller is not drive-critical, then
   granting a limited drive clearance after the software update.

9. The method as claimed in claim 8, wherein at least one of the first target state, the first actual state, the second target state, and the second actual state comprises a cryptographic hash value.

10. The method as claimed in claim 9, wherein a first hash function determines the cryptographic hash value of the first actual state during the software update of the set of controllers, and/or
wherein the first hash function determines the cryptographic hash value of the first actual state based on the cryptographic hash values of the second actual states from the set of second actual states.

11. The method as claimed in claim 10, wherein a second hash function determines the cryptographic hash value of the second actual state of the first controller after the software update of the first controller.

12. The method as claimed in claim 6, said method further comprising:
if the second deviation indicates a deviation between the second target state and the second actual state of the first controller, and if the property of the ascertained class of the first controller indicates that the first controller is not drive-critical, then
granting a limited drive clearance after the software update.

13. The method as claimed in claim 1, said method further comprising:
if the second deviation indicates a deviation between the second target state and the second actual state of the first controller, and if the property of the ascertained class of the first controller indicates that the first controller is drive-critical, then
inhibiting the drive clearance after the software update.

14. The method as claimed in claim 1, said method further comprising:
if the second deviation indicates a deviation between the second target state and the second actual state of the first controller, and if the property of the ascertained class of the first controller indicates that the first controller is not drive-critical, then
granting a limited drive clearance after the software update.

15. The method as claimed in claim 14, wherein downgrading of the first controller after the software update comprises:
ascertaining an additional controller from the set of controllers, the additional controller being able to execute a command to downgrade the first controller;
executing the command to downgrade the first controller on the ascertained additional controller; and
downgrading the first controller after the software update by executing the command to downgrade the first controller on the ascertained additional controller.

16. The method as claimed in claim 1, wherein downgrading of the first controller after the software update comprises:
ascertaining an additional controller from the set of controllers, the additional controller being able to execute a command to downgrade the first controller;
executing the command to downgrade the first controller on the ascertained additional controller; and
downgrading the first controller after the software update by executing the command to downgrade the first controller on the ascertained additional controller.

17. A computer-readable medium for ascertaining a drive clearance after a software update of a set of controllers of a vehicle, said computer-readable medium comprising instructions that, when executed on a computer and/or a controller, carry out the method as claimed in claim 1.

18. A system for ascertaining a drive clearance after a software update of a set of controllers of a vehicle, the system being designed to carry out the method as claimed in claim 1.

19. A vehicle comprising the system for ascertaining a drive clearance after a software update of a set of controllers of a vehicle as claimed in claim 18.

* * * * *